(12) United States Patent
Abe

(10) Patent No.: US 7,421,837 B2
(45) Date of Patent: Sep. 9, 2008

(54) CONTROL METHOD FOR AN EXHAUST GAS PURIFICATION SYSTEM AND AN EXHAUST GAS PURIFICATION SYSTEM

(75) Inventor: Kouzo Abe, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/082,824

(22) Filed: Mar. 18, 2005

(65) Prior Publication Data

US 2005/0223700 A1   Oct. 13, 2005

(30) Foreign Application Priority Data

Apr. 8, 2004   (JP) ............... 2004-113919

(51) Int. Cl.
*F01N 3/00* (2006.01)
(52) U.S. Cl. .............. 60/295; 60/274; 60/286; 60/297
(58) Field of Classification Search .......... 60/274, 60/277, 286, 285, 295, 297, 311; 55/DIG. 30
See application file for complete search history.

(56) References Cited

U.S. PATENT DOCUMENTS

| | | | | |
|---|---|---|---|---|
| 5,319,930 | A  * | 6/1994  | Shinzawa et al. | 60/286 |
| 6,622,480 | B2 * | 9/2003  | Tashiro et al.  | 60/295 |
| 6,644,021 | B2 * | 11/2003 | Okada et al.    | 60/286 |
| 6,829,890 | B2 * | 12/2004 | Gui et al.      | 60/295 |
| 6,851,258 | B2 * | 2/2005  | Kawashima et al. | 60/311 |
| 6,854,265 | B2 * | 2/2005  | Saito et al.    | 60/295 |
| 6,865,884 | B2 * | 3/2005  | Braun et al.    | 60/295 |
| 6,920,779 | B2 * | 7/2005  | Carlstrom et al. | 73/53.05 |
| 6,928,809 | B2 * | 8/2005  | Inoue et al.    | 60/297 |
| 6,971,970 | B2 * | 12/2005 | Inoue et al.    | 477/97 |
| 7,155,900 | B2 * | 1/2007  | Colignon        | 60/297 |

FOREIGN PATENT DOCUMENTS

| | | |
|---|---|---|
| EP | 1 195 508 | 4/2002 |
| EP | 1 321 642 | 6/2003 |
| JP | 2003-120390 | 4/2003 |
| JP | 2003-155916 | 5/2003 |

OTHER PUBLICATIONS

European Search Report, mailed Apr. 12, 2007 and issued in corresponding European Patent Application No. 05102142.6-1263.

* cited by examiner

*Primary Examiner*—Tu M. Nguyen
(74) *Attorney, Agent, or Firm*—Staas & Halsey LLP

(57) ABSTRACT

In an exhaust gas purification system with a continuous regeneration type DPF device, when a collecting quantity ($\Delta Pm$) of PM exceeds a predetermined judgment collecting quantity ($\Delta Pm0$), a number-of-regeneration-times coefficient (Rc) serving as an index of the number of regeneration times to a travel distance is compared with a predetermined judgment coefficient value (R0). When the number-of-regeneration-times coefficient (Rc) is smaller than the predetermined judgment coefficient value (R0), automatic traveling regeneration is performed. If this condition is not met, manual regeneration is performed.

4 Claims, 3 Drawing Sheets

CONTROL METHOD FOR AN EXHAUST GAS PURIFICATION SYSTEM AND AN EXHAUST GAS PURIFICATION SYSTEM

BACKGROUND OF THE INVENTION

The present invention relates to an exhaust gas purification system that purifies particulate matters from the exhaust gas discharged by diesel and other internal combustion engines using a continuous regeneration type diesel particulate filter device and also to a control method thereof In the same way as for NOx, CO, and also HC etc., restrictions on the volume of particulate matters (hereinafter referred to as "PM") discharged from diesel internal combustion engines grow severe every year. Techniques for collecting this PM in a filter known as a diesel particulate filter (hereinafter referred to as "DPF") and for reducing the quantity thereof by discharging externally have been developed.

DPFs for collecting this PM include a monolithic honeycomb form wall flow type filter made of ceramic, a fiber form type filter made of fiber shape ceramic or metal, and so on. An exhaust gas purification system using these DPFs are installed on the way of the exhaust passage of an internal combustion engine, similarly to the other exhaust gas purification systems, for cleaning exhaust gas generated in the internal combustion engine before discharging the same.

These DPF devices include a continuous regeneration type DPF device wherein an oxidation catalyst is installed upstream of the DPF, a continuous regeneration type DPF device wherein the PM combustion temperature is lowered by the effect of a catalyst supported on a filter with catalyst and PM is burned by the exhaust gas, etc.

The continuous regeneration type DPF device wherein the oxidation catalyst is installed upstream of the DPF uses the fact that the oxidation of PM by $NO_2$ (nitrogen dioxide) is executed at a lower temperature than the temperature at which PM is oxidized with oxygen in the exhaust gas. This continuous regeneration type DPF device is composed of an oxidation catalyst and a filter. NO (nitrogen monoxide) in the exhaust gas is oxidized to $NO_2$, by an oxidation catalyst supporting platinum or the like on the upstream side. PM collected by the filter on the downstream side is oxidized by this $NO_2$ to $CO_2$ (carbon dioxide). Thereby, PM is removed.

Besides, the continuous regeneration type DPF device of filter with catalyst is composed of a filter with catalyst such as cerium oxide ($CeO_2$). In this DPF device, PM is oxidized by a reaction ($4CeO_2+C \rightarrow 2Ce_2O_3+CO_2$, $2Ce_2O_3+O_2 \rightarrow 4CeO_2$, etc.) using $O_2$ (oxygen) in the exhaust gas by means of the filter with catalyst, within the low temperature range (on the order of 300° C. to 600° C.). PM is oxidized by $O_2$ (oxygen) in the exhaust gas, within the high temperature range (equal or higher than the order of 600° C.) which is higher than the temperature where PM is burned with $O_2$ in the exhaust gas.

In this continuous regeneration type DPF device of filter with catalyst and the like, the oxidation catalyst is also installed on the upstream side and oxidation and removal of PM is stimulated by raising exhaust gas temperature through oxidation reaction of unburned HC and CO in the exhaust gas. At the same time, the emission of unburned HC and CO into the atmosphere is prevented.

However, these continuous regeneration type DPF devices also cause the problem of exhaust pressure rise by the clogging of this filter. When the exhaust gas temperature is equal or higher than 350° C., PM collected by this filter (DPF) is burned continuously and cleaned, and the filter regenerates itself. However, in the case of low exhaust gas temperature and in an operating condition of an internal combustion engine where the emission of NO is low, for example, in the case where the low exhaust gas temperature state such as idling of internal combustion engine, low load/low speed operation continues, the oxidation reaction is not stimulated as the exhaust gas temperature is low, the catalyst temperature lowers and the catalyst is not activated and, moreover, NO lacks. Consequently, the aforementioned reaction does not occur and the filter can not be regenerated through oxidation of PM. As a result, PM continues to be accumulated in the filter and the filter clogging progresses.

As a measure against this filter clogging, it has been conceived to forcibly burn and remove the collected PM by forcibly raising the exhaust gas temperature, when the amount of clogging has exceeded a predetermined amount. As for means for detecting such filter clogging, there are some methods such as a method for detecting by the differential pressure before and after the filter, and a method for detecting through determination of the PM accumulation quantity by calculating in accordance of a map data in which the collecting quantity of PM to be collected is previously set based on the engine operation state. Besides, as means for exhaust gas temperature raising, there is a method by injection control of the fuel injection into a cylinder, or a method by fuel control in the direct fuel injection in the exhaust pipe.

In the case of this injection control of the fuel injection into a cylinder, when an exhaust gas temperature is lower than the active temperature of an oxidation catalyst supported by an oxidation catalyst or a filter set on the upstream side of the filter like the case of low speed or low load, an exhaust gas temperature necessary for PM combustion is not obtained. Therefore, the temperature of exhaust gas is raised through performing multi injection (multistage injection). Moreover, when the temperature of the exhaust gas becomes higher than the active temperature, post injection (posterior injection) is performed separately from normal fuel injection to burn the fuel in the exhaust gas by an oxidation catalyst and raise the temperature of the exhaust gas to a temperature at which the PM collected in a filter burns or higher. Thereby, the collected PM is burned and removed to regenerate the filter.

However, because the fuel for the post injection is not burned in the cylinder of an engine, injected fuel mixes in the oil of the engine through the joint of a piston ring or the like to cause oil dilution due to the fuel. The oil dilution causes deterioration of the viscosity of the engine oil etc. Therefore, when fuel dilution of a certain level or more occurs, it influences the durability of the engine and a problem occurs in the reliability of the engine. Therefore, it is necessary to keep the fuel dilution quantity within a constant level until replacement of the engine oil. However, because the way of being used of a vehicle is variously changed, the distance at which the collecting quantity of PM reaches a limit to require forced regeneration is changed. Therefore, there is a problem that the fuel dilution quantity cannot be controlled.

Moreover, when the problem of the oil dilution is left as it is, abrasion or seizure of the sliding portion of an engine is caused. Therefore, it is important to solve the problem. Furthermore, to keep an oil replacement distance, it is important to perform the control for minimizing unburned fuel injected through the post injection in forced regeneration.

For example, when a vehicle travels for a considerable travel distance, the fuel mixed in oil is evaporated. Therefore, oil dilution is improved. To solve the problem that oil is excessively diluted, the following exhaust gas purification device for internal combustion engine is disclosed in Japanese patent application Kokai publication No. 2003-120390. This device judges the period from a subordinate injection date and time of unburned fuel of previous time up to the subordinate injection date and time of this time. When this period is longer than a predetermined period required for all unburned fuel diluted in lubricant to evaporate, a large retardation value of subordinate injection is taken to increase the unburned fuel to be added to a catalyst. When the former period is shorter than the latter period, dilution is not performed.

However, when the forced regeneration processing is carried out while a vehicle travels, the control of the post injection at the time of transition at a change of operations of an engine is difficult compared to a stable condition while the vehicle stops. That is, even if loads are changed and an engine temperature rises in a transition state, it is difficult to avoid unnecessary injection (unnecessary strike) that post injection is performed. As a result, the frequency of oil dilution due to unburned fuel increases.

That is, an operation state is not stabilized by automatic forced regeneration during vehicle traveling. Therefore, the fuel injection quantity in the post injection increases. Moreover, because oil is diluted due to a large amount of unburned fuel post-injected for DPF regeneration, the oil viscosity is deteriorated. Furthermore, the oil replacement distance decreases. Therefore, it is not preferable that the forced regeneration processing is frequently performed during vehicle traveling.

However, in the case of forced regeneration control while a vehicle stops, the operation state is stabilized because of the stop, the injection quantity of fuel decreases, and oil dilution is comparatively small. Therefore, it is considered to stop a vehicle and then perform the forced regeneration without performing the forced regeneration control while the vehicle travels. That is, when the operation condition such as idling while the vehicle stops is stabilized, the forced regeneration is performed by performing post injection of an injection quantity smaller than the load while the vehicle travels to raise temperature. Thereby, oil dilution is decreased compared to the case of regeneration control while a vehicle travels. Thereby, problems of the oil dilution are solved.

As one of the solutions, a method is considered in which a filter is regenerated by using a lamp etc. and thereby notifying a driver that forced regeneration is necessary when a filter is clogged at a predetermined value and the driver receiving the notification stops a vehicle and then operates a manual regeneration switch at the driver seat to perform the forced regeneration control.

However, when using the above method, in the case of a vehicle having many patterns for traveling in a low-speed large-load operation state, manual regeneration is frequently necessary. Therefore, a lamp for prompting manual regeneration is turned on, that is, the interval for requesting a driver to press a manual regeneration switch becomes short and the frequency for the request becomes frequent. Therefore, a problem of making the driver feel botheration occurs.

SUMMARY OF THE INVENTION

It is an object of the present invention to provide an exhaust gas purification system control method and an exhaust gas purification system capable of prompting a driver to stop a vehicle and perform manual regeneration by operating a manual regeneration switch in accordance with a warning such as flashing of an indicator lamp in the case where it is detected that a detected collecting quantity is larger than the predetermined judgment collecting quantity with regard to regeneration of the continuous regeneration type DPF device or greatly decreasing the frequency of manual regeneration to improve the operability for a driver, and solving an oil dilution problem due to a large amount of unburned fuel injected for DPF regeneration in an exhaust gas purification system for performing automatic regeneration to be automatically performed while a vehicle travels.

To achieve the above object, a control method for an exhaust gas purification system of the present invention, in an internal combustion engine mounted on a vehicle provided with a continuous regeneration type diesel particulate filter device in the exhaust passage thereof, having a diesel particulate filter control means including;

a collecting quantity detection means for detecting the collecting quantity of collected matters in the continuous regeneration type diesel particulate filter device, a travel distance detection means for detecting the travel distance of the vehicle, a forced regeneration control means for performing post injection in a fuel injection control into a cylinder to raise an exhaust gas temperature, forcibly burning the collected matters and regenerating the continuous regeneration type diesel particulate filter device, a warning means for warning a driver so as to prompt the actuation of the forced regeneration control means when it is detected that the collecting quantity detected by the collecting quantity detection means is larger than a predetermined judgment collecting quantity, and a number-of-regeneration-times detection means for counting the number of regeneration times by the forced regeneration control means wherein when the collecting quantity of the collected matters detected by the collecting quantity detection means exceeds the predetermined judgment collecting quantity, a number-of-regeneration-times coefficient as an index of the number of regeneration times to a travel distance is compared with a predetermined judgment coefficient value;

when the number-of-regeneration-times coefficient is smaller than the predetermined judgment coefficient value, a travel automatic regeneration is performed, and when the number-of-regeneration-times coefficient is not less than the predetermined judgment coefficient value, the warning is given to the driver to prompt the actuation of the forced regeneration control means.

Moreover, an exhaust gas purification system, in an internal combustion engine mounted on a vehicle provided with a continuous regeneration type diesel particulate filter device in the exhaust passage thereof, having a diesel particulate filter control means including;

a collecting quantity detection means for detecting the collecting quantity of collected matters in the continuous regeneration type diesel particulate filter device, a travel distance detection means for detecting the travel distance of the vehicle, a forced regeneration control means for performing post injection in a fuel injection control into a cylinder to raise an exhaust gas temperature, forcibly burning the collected matters and regenerating the continuous regeneration type diesel particulate filter device, a warning means for warning a driver so as to prompt the actuation of the forced regeneration control means when it is detected that the collecting quantity detected by the collecting quantity detection means is larger than a predetermined judgment collecting quantity, and a number-of-regeneration-times detection means for counting the number of regeneration times by the forced regeneration control means, wherein when the collecting quantity of the collected matters detected by the collecting quantity detection means exceeds the predetermined judgment collecting quantity, the diesel particulate filter control means compares a number-of-regeneration-times coefficient as an index of the number of regeneration times to a travel distance with a predetermined judgment coefficient value, performs the automatic travel regeneration when the number-of-regeneration-times coefficient is smaller than the predetermined judgment coefficient value, and warns the driver to prompt the actuation of the forced regeneration control means when the number-of-regeneration-times coefficient is not less than the predetermined judgment coefficient value.

That is, by counting the travel distance of an engine and the number of regeneration times of DPF and comparing the counted value with a predetermined judgment coefficient value serving as an allowance of dilution by oil fuel, an oil diluted state is judged. Moreover, automatic traveling regeneration is performed while traveling a vehicle in which diluted fuel quantity increases when the degree of oil dilution is low. Thereby, the diluted fuel quantity is controlled so that it is kept within a constant value. Moreover, the number of regeneration times of DPF is a coefficient based on the number of regeneration times $Na$ of automatic regeneration, the number of regeneration times $Nm$ of manual regeneration, and travel distance $Lm$ and serves as an index of the number of regeneration times to the travel distance.

The number-of-regeneration-times coefficient $Rc$ is calculated in accordance with $Rc=(a \times Nm+b \times Na-c)/Lm$ by assuming $a$, $b$, and $c$ as constants set correspondingly to an engine. However, it is allowed to use a coefficient other than the above one as long as it is based on the number of regeneration times $Na$ of automatic traveling regeneration, number of regeneration times $Nm$ of manual regeneration, and travel distance $Lm$.

Moreover, as the continuous regeneration type DPF device in the above exhaust gas purification system, there are a continuous regeneration type DPF device making a filter support an oxidation catalyst, a continuous regeneration type DPF device in which an oxidation catalyst is set on the upstream side of a filter, and a continuous regeneration type DPF device in which a catalyst is supported on a filter and an oxidation catalyst is set on the upstream side of the filter.

According to the control method for an exhaust gas purification system and an exhaust gas purification system of the present invention, when detecting that a detected collecting quantity is larger than a predetermined judgment collecting quantity with regard to regeneration of a continuous regeneration type DPF device, manual regeneration performed when a driver stops a vehicle in accordance with a warning such as flashing of an indicator lamp and performs forced regeneration by operating a manual regeneration switch is alternatively used with automatic traveling regeneration for automatically performing forced regeneration while a vehicle travels in accordance with a number-of-regeneration-times coefficient serving as an index of the number of regeneration times to a travel distance. Therefore, it is possible to prevent oil from being excessively diluted while corresponding to a change of traveling patterns of a vehicle and avoiding the manual regeneration whose convenience is inferior in using the vehicle.

Moreover, it is possible to select automatic traveling regeneration while diluted oil quantity is small and select manual regeneration only when the diluted oil quantity is large. Therefore, it is possible to extremely decrease the frequency of manual regeneration in accordance with the operation of the manual regeneration switch and improve the operability for a driver.

Furthermore, it is possible to control the degree of dilution of oil by unburned fuel to be added by post injection. Therefore, it is possible to improve the durability of an engine and secure the reliability of the engine.

DETAILED DESCRIPTION OF THE PREFERRED EMBODIMENT

Hereinafter, the preferred embodiments of the control method for an exhaust gas purification system and the exhaust gas purification system according to the present invention will be described with reference to the accompanying drawings. The following explanation will use the example of an exhaust gas purification system provided with a continuous regeneration type diesel particulate filter (DPF) device comprising a combination of an oxidation catalyst and a filter with a catalyst.

Figure 1:
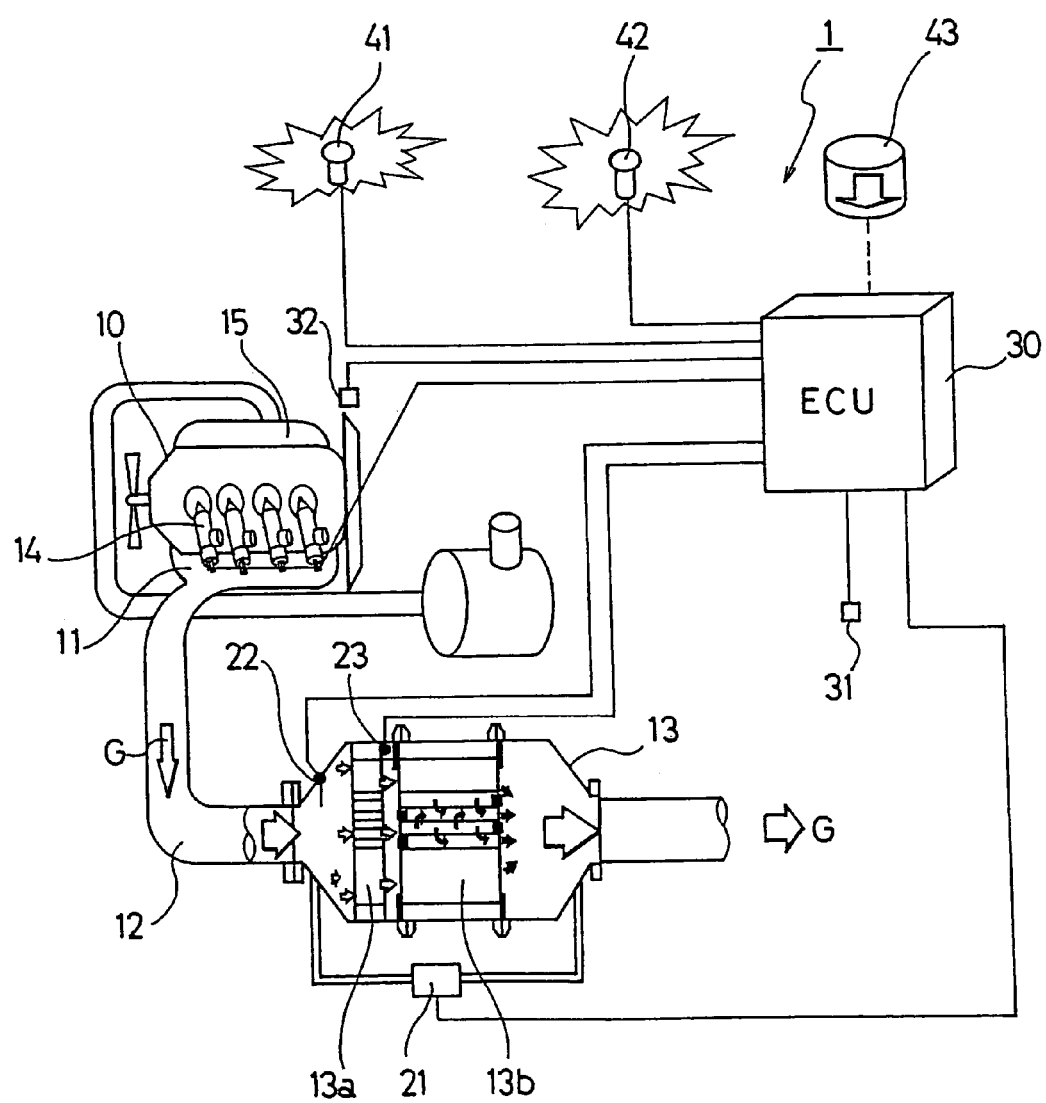
FIG. 1 is a systematic block diagram of the exhaust gas purification system according to an embodiment of the present invention.

FIG. 1 shows the configuration of an exhaust gas purification system 1 for an internal combustion engine according to an embodiment of the present invention. This exhaust gas purification system 1 is configured to provide a continuous regeneration DPF device 13 on an exhaust passage 12 connected to an exhaust manifold 11 of a diesel engine 10. This continuous regeneration DPF device 13 is configured with an oxidation catalyst 13a on the upstream side thereof and a filter with catalyst 13b on the downstream side thereof.

The oxidation catalyst 13a is formed so as to support an oxidation catalyst of platinum (Pt) etc. on a support with a ceramic honeycomb structure etc. The filter with catalyst 13b is formed of a monolithic honeycomb type, wall flow type filter with entrances and exits to channels in a porous ceramic honeycomb alternately closed or a felt-type filter with randomly layered alumina other inorganic fibers or the like. A platinum or cerium oxide etc. catalyst is supported on this filter portion.

In cases where a monolithic honeycomb type, wall flow type filter is used as the filter with catalyst 13b, the particulate matter (PM) contained in the exhaust gas is collected (trapped) in the porous ceramic walls. When a fabric type filter type is used, PM is collected in the inorganic fibers thereof.

A pressure difference sensor 21 is provided on the conduit tube in front of and behind the continuous regeneration DPF device 13 in order to estimate the collecting quantity of PM on the filter with catalyst 13b. For the purpose of regeneration control of the filter with catalyst 13b, furthermore, an oxidation catalyst inlet exhaust gas temperature sensor 22 is provided upstream of the oxidation catalyst 13a and a filter inlet exhaust gas temperature sensor 23 is provided between the oxidation catalyst 13a and the filter with catalyst 13b.

The output values from these sensors are input to an engine control unit (ECU) 30. In addition to controlling the overall operation of the engine 10, the engine control unit 30 also performs regeneration control of the operation of the continuous regeneration DPF device 13. The fuel injection devices (i.e., injection nozzles) 14 of the engine 10 and, wherever necessary, the intake throttle valve (not shown) adjusting the intake quantity of the intake manifold 15 and the EGR valve for adjusting the EGR volume are controlled in accordance with the control signals output from this engine control unit 30. The EGR valve is provided together with the EGR cooler on the EGR passage (not shown).

These fuel injection devices 14 are connected to a common-rail fuel injection system (not shown) storing temporarily the fuel pressurized to high pressure by the fuel pump (not shown). In order to operate the engine, the accelerator opening from the accelerator position sensor (APS) 31 and the engine speed from the engine speed sensor 32 etc. are input into the engine control unit 30 together with other data such as the vehicle speed and cooling water temperature, etc.

Figure 2:
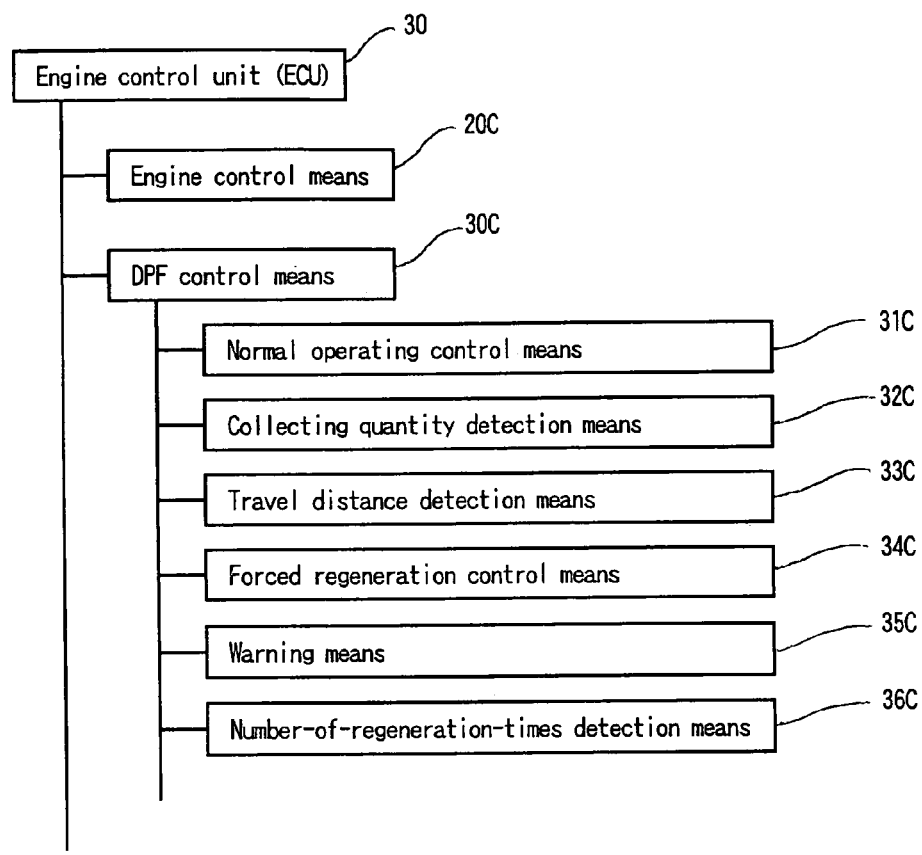
FIG. 2 is a drawing showing the control means configuration for the exhaust gas purification system according to an embodiment of the present invention.

As shown in FIG. 2, the engine control unit 30 according to the present invention comprises an engine control means 20C controlling driving of the engine and a DPF control means 30C for the exhaust gas purification system 1 etc. The DPF control means 30C comprises a normal operating control means 31C, a collecting quantity detection means 32C, a travel distance detection means 33C, a forced regeneration control means 34C, a warning means 35C, a number-of-regeneration-times detection means 36C, etc.

The normal operating control means 31C is in particular a means for performing normal operation unrelated to regeneration of the continuous regeneration DPF device 13. In the normal operating control means 31C, normal injection control is carried out wherein a predetermined volume of fuel is injected from the fuel injection devices 14 in accordance with an electric current time signal calculated in the engine control unit 30 based on signals from the accelerator position sensor 31 and signals from the engine speed sensor 32.

The collecting quantity detection means 32C is a means for detecting the collecting quantity $\Delta Pm$ accumulated in the filter with catalyst 13b of the continuous regeneration DPF device 13. Detection of this collecting quantity $\Delta Pm$ is carried out using the cumulative calculated value of the collecting quantity estimated from the engine speed and load, the engine rotating accumulated time, and the differential pressure before and after the continuous regeneration DPF device 13 etc. In this embodiment, detection thereof is carried out based on the differential pressure before and after the continuous regeneration DPF device 13—that is, the measurement values from the differential pressure sensor 21.

The travel distance detection means 33C is means for detecting the distance Lm in which a vehicle travels.

The forced regeneration control means 34C performs multi injection (multistage injection) in the fuel injection into a cylinder of the engine 10 though slightly different in control depending on the type of the continuous regeneration type DPF device 13 to raise an exhaust gas temperature up to the active temperature of the oxidation catalyst 13a. Thereafter, post injection (posterior injection) is performed to raise the entrance exhaust gas temperature of a filter to be detected by a filter entrance exhaust gas temperature sensor 23 so that a temperature and environment suitable for oxidation removal of PM are realized. Thereby, the PM collected by the filter with catalyst 13b is forcibly burned and removed to forcibly regenerate the filter with catalyst 13b. Intake-system control such as intake throttling or EGR may be used together.

The warning means 35C is constituted of a repeater indicator (DPF lamp) 41, an alarm lamp (warning lamp) 42, etc. The warning means 35C is means for warning a driver so as to prompt the operation of the forced regeneration control means 34C through flashing of the repeater indicator 41 or prompting a driver to bring a vehicle to a service center through turning-on of the alarm lamp 42. A driver warned by the flashing of the repeater indicator 41 can actuate the forced regeneration control means 34C by operating the manual regeneration switch 43.

The number-of-regeneration-times detection means 36C is means for counting the numbers of regeneration times Na and Nm by the forced regeneration control means 34C, which counts the numbers of regeneration times of automatic traveling regeneration and manual regeneration.

The DPF control means 30C having these means continues the normal operation by the normal operating control means 31C in accordance with the collecting quantity $\Delta Pm$ of PM detected by the collecting quantity detection means 32C, warns a driver to prompt the manual operation of the forced regeneration control means 34C, or automatically operates the forced regeneration control means 34C during vehicle traveling.

Moreover, in the case of the present invention, when the forced regeneration control is necessary, the number-of-regeneration-times coefficient Rc serving as an index for the number of regeneration times to a travel distance is compared with a predetermined judgment coefficient value R0 by using the travel distance Lm detected by the travel distance detection means 33C and the numbers of regeneration times Na and Nm detected by the number-of-regeneration-times detection means 36C. Then, when the number-of-regeneration-times coefficient Rc is smaller than the predetermined judgment coefficient value R0, automatic traveling regeneration is performed. When the number-of-regeneration-times coefficient Rc is equal to or larger than the predetermined judgment coefficient value R0, a driver is warned to prompt the operation of the forced regeneration control means 34C.

That is, the vehicle travel distance Lm and the numbers of regeneration times Na and Nm of DPF are counted and when a request for forced regeneration of DPF is generated, it is judged by the number-of-regeneration-times coefficient Rc serving as an index of the number of regeneration times to the travel distance whether they are kept in a dilution allowance. Moreover, automatic traveling regeneration is performed when they are kept in the dilution allowance, automatic traveling regeneration is performed and when they exceed the dilution allowance, manual regeneration is performed. Thereby, proper regeneration control is selected.

Figure 3:
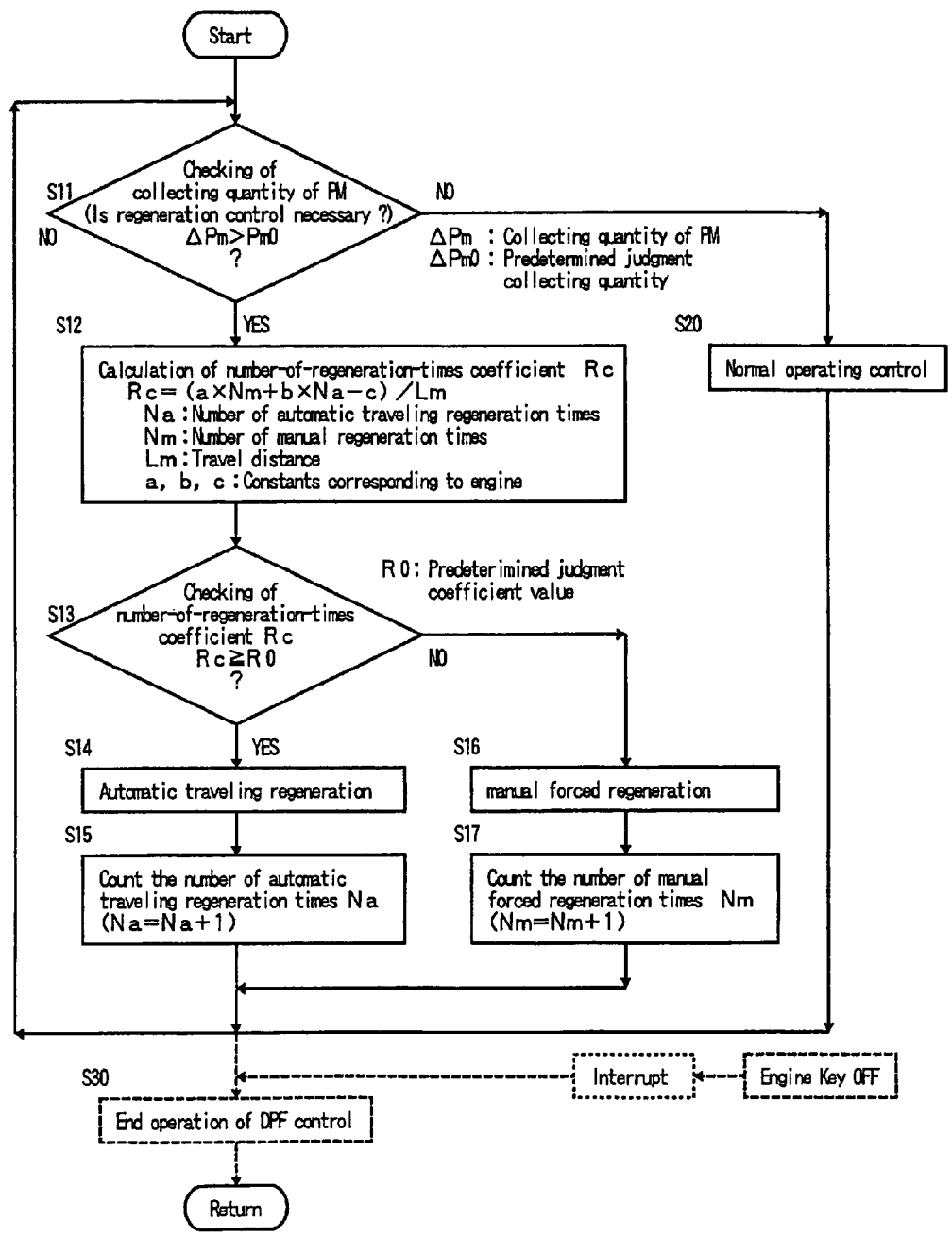
FIG. 3 is a drawing showing the DPF control flow of the exhaust gas purification system according to an embodiment of the present invention.

Then, the regeneration control of the exhaust gas purification system 1 is described. In the case of the control of the exhaust gas purification system 1, the control following the control flow shown in FIG. 3 is performed. The control flow in FIG. 3 is shown as a flow starting with the start of an engine and ending with the end of the main engine control.

When the control flow is called from the flow of main engine control and started, the collecting quantity $\Delta Pm$ of PM is checked in step S11. That is, whether regeneration control is necessary is judged in accordance with whether the detected collecting quantity $\Delta Pm$ is larger than a predetermined judgment collecting quantity $\Delta Pm0$.

In the case of the above judgment, the filter with catalyst 13b is slightly clogged while the collecting quantity $\Delta Pm$ of PM is equal to or less than the predetermined judgment collecting quantity $\Delta Pm0$ and it is judged that the operation of the forced regeneration control means 34C is unnecessary. Then, in step S20, the normal operating control by the normal operating control means 31C is performed for a predetermined control time relating to the interval of checking of the collecting quantity $\Delta Pm$ and the operation returns to step S11.

Moreover, when the collecting quantity $\Delta Pm$ becomes larger than the predetermined judgment collecting quantity $\Delta Pm0$ in step S11, the number-of-regeneration-times coefficient Rc serving as an index of the number of regeneration times to a travel distance is calculated in step S12. When it is assumed that the number of automatic regeneration times is Na, the number of manual regeneration is Nm, and detected travel distance is Lm, the above calculation is performed in accordance with the expression Rc=(a×Nm+b×Na−c)/Lm. Moreover, a, b, and c in the above expression are constants decided by a purposed engine and they are values previously set in accordance with such an experiment previously performed.

In the next step S13, the number-of-regeneration-times coefficient Rc is checked. This checking is performed in accordance with whether the number-of-regeneration-times coefficient Rc is smaller than the predetermined judgment coefficient value (fuel dilution allowance) R0. When the number-of-regeneration-times coefficient Rc is smaller than the predetermined judgment coefficient value R0 as a result of the above judgment, the quantity of fuel mixed in engine oil is small or the fuel mixed in the engine oil is sufficiently evaporated. Therefore, it is judged that the forced regeneration during traveling, that is automatic traveling regeneration can be made. In step S14 the automatic traveling regeneration is carried out until the regeneration of DPF is completed. Then, in step S15, the number-of-automatic traveling regeneration times Na is counted and the operation is returned to step S11. When judging a collecting quantity in accordance with not a differential pressure ΔPm but an accumulated calculated value of PM, the accumulated calculated value of the PM is also reset in step S15. The automatic traveling regeneration facilitates to reduce the load due to manual forced regeneration by a driver, that is, on on/off operation of the manual regeneration switch 43.

Moreover, when the number-of-regeneration-times coefficient Rc is the predetermined judgment coefficient value R0 or more through the judgment in step S13, the driver is warned to prompt the operation of the forced regeneration control means 34C in step S16. That is, automatic traveling regeneration is inhibited in order to avoid the problem of oil dilution at the time of forced regeneration and the repeater indicator (DPF lamp) 41 is flashed. This prompts the driver to carry out forced regeneration after stopping a vehicle, that is, manual regeneration. The driver stops the vehicle in accordance with the warning and turns on the manual regeneration switch. Thereby, manual regeneration is started and continued until regeneration of DPF is completed. Thereafter, in step S17, the number of manual regeneration times Nm is counted and the operation returns to step S11. When a collecting quantity is judged in accordance with not the differential pressure ΔPm but the accumulated calculated value of PM, the accumulated calculated value of the PM is also reset in step S17.

The above steps S11 to S20, steps S11 to S15, or steps S11 to S17 are repeated. Then, the vehicle is driven while repeating normal operating control and forced regeneration control. Then, when the engine key is turned off, an interruption occurs, the end operation of the DPF control in step S30 is started, and the operation is returned. Then, the operation is completed together with the end of main engine control.

According to the above control, when the collecting quantity of collected matters (differential pressure) ΔPm detected by the collecting quantity detection means 32C exceeds the predetermined judgment collecting quantity ΔPm0, the number-of-regeneration-times coefficient Rc is compared with the predetermined judgment coefficient value R0. When the number-of-regeneration-times coefficient Rc is smaller than the predetermined judgment coefficient value R0, it is possible to perform automatic traveling regeneration. Moreover, when the number-of-regeneration-times coefficient Rc is equal to or more than the predetermined judgment coefficient value R0, it is possible to warn the driver to prompt the actuation of the forced regeneration control means 34C.

Therefore, it is possible to prevent oil from being excessively diluted while avoiding the manual regeneration inferior in convenience for use of a vehicle to the utmost and corresponding to a change of traveling patterns of the vehicle.

Moreover, automatic traveling regeneration is normally selected but manual regeneration is selected only when the manual regeneration is necessary for dilution of oil. Therefore, it is possible to greatly decrease the frequency of manual regeneration by operating a manual regeneration switch and improve the operability for a user.

Furthermore, it is possible to control the degree of dilution due to oil fuel. Therefore, the durability of an engine is improved and it is possible to secure the reliability of the engine.

The above explanation deals with the example of a continuous regeneration type DPF device in the exhaust gas purification system realized as a continuous regeneration type DPF device providing an oxidation catalyst on the upstream side of the filter while also making a catalyst supported on the filter; however, the present invention is not restricted to this embodiment. Furthermore, the continuous regeneration type DPF device may also be of the type making an oxidation catalyst supported on the filter or providing an oxidation catalyst on the upstream side of the filter, etc.

What is claimed is:

1. A control method for an internal combustion engine in a vehicle, the internal combustion engine comprising a continuous regeneration type diesel particulate filter device, the method comprising:
    comparing a number-of-regeneration-times coefficient as an index of a number of regenerating operations of the filter device to a travel distance of the vehicle with a predetermined judgment coefficient value when a detected quantity of collected matters of the filter device exceeds a predetermined judgment correcting quantity;
    performing a travel automatic regeneration when the number-of-regeneration-times coefficient is smaller than the predetermined judgment coefficient value; and
    warning a driver of the vehicle to actuate forced regeneration control when the number-of-regeneration-times coefficient is not less than the predetermined judgment coefficient value.

2. A control method for an exhaust gas purification system, in an internal combustion engine mounted on a vehicle provided with a continuous regeneration type diesel particulate filter device in an exhaust passage thereof, the method comprising:
    detecting a quantity of collected matters in the continuous regeneration type diesel particulate filter device;
    detecting a travel distance of the vehicle;
    performing a post injection in a fuel injection into a cylinder of the internal combustion engine to raise a temperature of the exhaust gas and forcibly burning the collected matters, thereby regenerating the continuous regeneration type diesel particulate filter device;
    warning a driver of the vehicle to actuate a forced regeneration control when it is detected that the detected quantity of the collected matters is larger than a predetermined judgment collecting quantity;
    counting a number of the regenerating operations
    comparing a number-of-regeneration-times coefficient as an index of the number of regenerating operations to the travel distance with a predetermined judgment coefficient value when the detected quantity of collected matters exceeds the predetermined judgment correcting quantity;

performing a travel automatic regeneration when the number-of-regeneration-times coefficient is smaller than the predetermined judgment coefficient value; and warning the driver of the vehicle to actuate the forced regeneration control when the number-of-regeneration-times coefficient is not less than the predetermined judgment coefficient value.

3. The control method of claim 2, further comprising judging an oil dilution condition according to the travel distance, the number of regenerating operations and the number-of-regeneration-times coefficient.

4. An exhaust gas purification system, in an internal combustion engine mounted on a vehicle provided with a continuous regeneration type diesel particulate filter device in the exhaust passage thereof; having a diesel particulate filter control means including;

a collecting quantity detection means for detecting the collecting quantity of collected matters in the continuous regeneration type diesel particulate filter device, a travel distance detection means for detecting the travel distance of the vehicle, a forced regeneration control means for performing post injection in a fuel injection control into a cylinder to raise an exhaust gas temperature, forcibly burning the collected matters and regenerating the continuous regeneration type diesel particulate filter device, a warning means for warning a driver so as to prompt the actuation of the forced regeneration control means when it is detected that the collecting quantity detected by the collecting quantity detection means is larger than a predetermined judgment collecting quantity, and a number-of-regeneration times detection means for counting the number of regeneration times by the forced regeneration control means, wherein when the collecting quantity of the collected matters detected by the collecting quantity detection means exceeds the predetermined judgment collecting quantity, the diesel particulate filter control means compares a number-of-regeneration-times coefficient as an index of the number of regeneration times to a travel distance with a predetermined judgment coefficient value, performs the automatic travel regeneration when the number-of-regeneration-times coefficient is smaller than the predetermined judgment coefficient value, and warns the driver to prompt the actuation of the forced regeneration control means when the number-of-regeneration-times coefficient is not less than the predetermined judgment coefficient value.

* * * * *